(12) United States Patent
Bramanti

(10) Patent No.: US 11,531,729 B2
(45) Date of Patent: Dec. 20, 2022

(54) BITWISE DIGITAL CIRCUIT AND METHOD FOR PERFORMING APPROXIMATE OPERATIONS

(71) Applicant: STMICROELECTRONICS S.R.L., Agrate Brianza (IT)

(72) Inventor: Alessandro Paolo Bramanti, Maglie (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 139 days.

(21) Appl. No.: 17/060,994

(22) Filed: Oct. 1, 2020

(65) Prior Publication Data
US 2021/0103631 A1 Apr. 8, 2021

Related U.S. Application Data

(60) Provisional application No. 62/911,005, filed on Oct. 4, 2019.

(51) Int. Cl.
| | |
|---|---|
| *G06F 17/17* | (2006.01) |
| *G06F 5/01* | (2006.01) |
| *G06F 7/52* | (2006.01) |

(52) U.S. Cl.
CPC ............... *G06F 17/17* (2013.01); *G06F 5/01* (2013.01); *G06F 7/52* (2013.01)

(58) Field of Classification Search
CPC .............. G06F 5/01; G06F 7/52; G06F 17/17
See application file for complete search history.

(56) References Cited

U.S. PATENT DOCUMENTS

| | | |
|---|---|---|
| 6,163,791 A | 12/2000 | Schmookler et al. |
| 7,013,320 B2 | 3/2006 | Tang |
| 7,389,317 B2 | 6/2008 | Guttag et al. |
| 9,411,756 B2 | 8/2016 | Nogueira et al. |
| 9,851,947 B2 | 12/2017 | Yukiyama et al. |

(Continued)

OTHER PUBLICATIONS

Amini et al., "A Low-Power Parallel Architecture for Finite Galois Field $GF(2^m)$ Arithmetic Operations for Elliptic Curve Cryptography," The Center for Advanced Computer Studies, University of Louisiana at Lafayette, 2012, 44 pages.

(Continued)

*Primary Examiner* — Chuong D Ngo
(74) *Attorney, Agent, or Firm* — Seed Intellectual Property Law Group LLP

(57) ABSTRACT

Approximation circuitry utilizes bitwise operations on operands to provide approximate results of operations on the operands. A significant digit detector utilizes bitwise operations on the received operands to identify or detect approximate most significant bits in the operands, and then utilizes these identified most significant bits to generate approximate values for each of the operands. Intermediate registers receive and store the approximate values from the significant digit detector. A combinatorial network, such as a lookup table (LUT), thereafter utilizes the approximate values stored in the intermediate registers to generate an approximate result. The approximate result has a value that is an approximate value of a given operation, such as multiplication or division, on the operands provided to the significant digit detector.

20 Claims, 10 Drawing Sheets

(56) References Cited

U.S. PATENT DOCUMENTS

2018/0336165 A1* 11/2018 Phelps ................ G06F 9/30014
2019/0294964 A1* 9/2019 Ouchi .................... G06N 3/063
2020/0210839 A1* 7/2020 Lo .......................... G06N 20/00

OTHER PUBLICATIONS

Hung et al., "Fast Division Algorithm with a Small Lookup Table," Computer Systems Laboratory, Stanford University, 2002, 4 pages.

* cited by examiner

BITWISE DIGITAL CIRCUIT AND METHOD FOR PERFORMING APPROXIMATE OPERATIONS

BACKGROUND

Technical Field

The present application is directed generally to digital circuits for performing operations, and, more specifically, to digital circuitry that generates approximate results of operations through bitwise operations to reduce the power consumption of performing these operations.

Description of the Related Art

Mobile and wearable devices are already ubiquitous and the Internet of things (IoT) and coming 5G communications networks will only accelerate the growth of such devices. A typical mobile or wearable device includes sensors such as accelerometers and gyroscopes for movement analysis like pace counting and human activity recognition, as well as other types of sensors like microphones, proximity sensors, and so on. In operations, these sensors detect the corresponding parameter being sensed, such as acceleration or rotation, and generate a corresponding analog electrical signal having characteristics indicating the sensed parameter. This analog signal is then typically digitized and some type of post-processing performed on the digital signal, such as filtering, scaling, and so on.

The specific type of post-processing performed depends on the type of sensor. This post-processing must not, however, consume much electrical power since the corresponding mobile or wearable device is typically battery powered. Moreover, the sensors and corresponding mobile or wearable device must be physically small so as to be utilized unobtrusively in a variety of different types of environments. While conventional circuitry for performing this post-processing may be relatively simple, the power consumed by this circuitry is limited in mobile and wearable devices.

Common post-processing operations that must be performed on digital values of the digital signal from a sensor are multiplication and division. These operations are easily performed through conventional circuitry, such as a microcontroller, but such a circuit typically consumes a relatively large amount of power. As a result, conventional circuitry for performing these operations may not be suitable for use in many mobile or wearable devices. Some prior approaches have been utilized to simplify the circuitry required to perform various types of commonly arising operations, such as particular algorithms like the Fast Fourier Transform (FFT) and performing multiplication and division operations through the shifting of bits of digital values stored in registers. These approaches, however, are limited to situations where powers of two are acceptable. Another approach that has been utilized is a Lookup Table (LUT), but is limited to numbers having only a few digits or the LUT expands exponentially with increasing size of the numbers.

There is a need for digital circuitry to perform common operations while consuming a relatively small amount of power in performing these operations to enable the digital circuitry to be utilized in mobile and wearable devices.

BRIEF SUMMARY

Embodiments of the present disclosure are directed to approximation circuitry that utilizes bitwise operations to provide approximate results of operations. These bitwise operations reduce the power consumption of the approximation circuitry in providing the approximate results, and thereby enable the inclusion of the approximation circuitry in electronic devices having limited electrical power available, such as mobile and wearable devices. Although the approximation circuitry provides only an approximate result of the operation, such as multiplication of two operands, this reduced precision would be acceptable in many applications having limited availability of electrical power.

In one embodiment of the present disclosure, an approximation circuit includes a first intermediate register configured to store a first approximate value of a first operand. The first operand has N bits and the first approximate value has M bits, where M is less than N. A second intermediate register is configured to store a second approximate value of a second operand, where the second operand has N bits and the second approximate value has M bits. A significant digit detector includes first and second operand registers configured to store the first and second operands. The significant bit detector is configured to perform bitwise comparisons on pairs of bits of the first and second operands to identify an approximate most significant bit in one of the first and second operands, and is further configured to store the M bits of the first approximate value in the first intermediate register and to store the M bits of the second approximate value in the second intermediate register. A logic circuit is coupled to the first and second intermediate registers and configured to generate, based on the approximate values of the first and second operands stored in the first and second intermediate registers, an output signal indicating an approximate value of an operation on the first and second operands.

In one embodiment, the logic circuit is a lookup table. The operation may be an arithmetic operation, such as one of a multiplication and a division operation. In an embodiment, the first and second intermediate registers are configured to store first and second sign bits of the first and second approximate values, respectively. In an embodiment, each of the first and second operand registers is configured to store the corresponding operand in signed-magnitude format.

In an embodiment, the first and second operand registers are first and second circular shift registers, respectively. Each of the first and second circular shift registers is configured to output a bit stored in an output bit storage location of the circular shift register. The significant digit detector is further configured to store the first and second operands in the first and second circular shift registers. The first and second operands are stored in the first and second circular shift registers with a most significant bit of the first and second operands in the output bit storage location of the first and second circular shift registers, respectively. The significant digit detector controls the first and second circular shift registers to sequentially shift the remaining bits of the first and second operands into the output storage locations to sequentially output bitwise pairs of bits of the operands. Bitwise comparisons are performed on the bitwise pairs of bits sequentially output from the output storage locations to detect whether at least one of the bits of the bitwise pair being output is a non-zero bit. An approximate most significant bit of the first and second operands is identified or detected in response to detecting at least one of the bits of the bitwise pair being output is a non-zero bit.

In an embodiment, the approximate most significant bit is at an ith bit position of each operand, where i=N to 1, with the most significant bit of each operand being the Nth bit position, and wherein the significant digit detector is further configured to store the ith bit through the (i-n)th bit of each operand in the intermediate registers, where n is an approximation depth that defines the number of bits of the approximate values stored in the intermediate registers.

BRIEF DESCRIPTION OF THE SEVERAL VIEWS OF THE DRAWINGS

For a better understanding of the present disclosure, embodiments thereof are now described purely by way of non-limiting example, with reference to the attached drawings, wherein.

DETAILED DESCRIPTION

Figure 1:
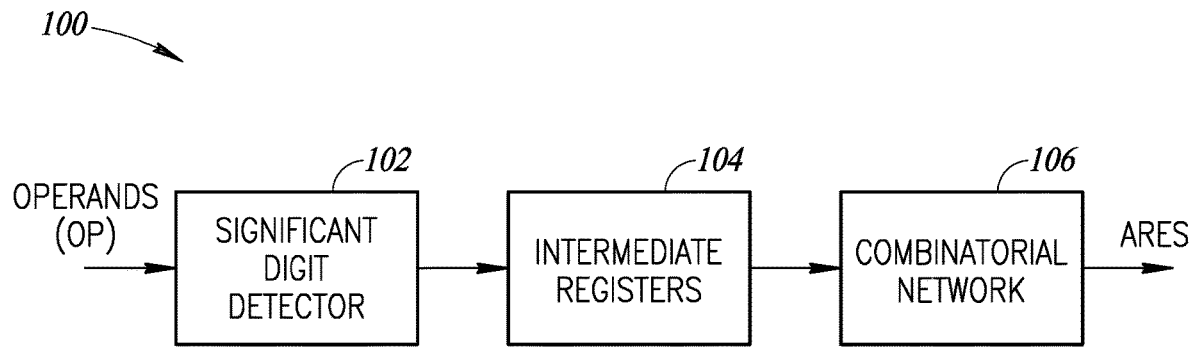
FIG. 1 is a functional block diagram of approximation circuitry according to one embodiment of the present disclosure.

FIG. 1 is a functional block diagram of approximation circuitry 100 that utilizes bitwise operations on operands to provide approximate results of operations on the operands according to embodiments of the present disclosure. In operation, a significant digit detector 102 utilizes bitwise operations on received operands OP to identify or detect approximate most significant bits in the operands, and then utilizes these identified most significant bits to generate approximate values AV for each of the operands. Intermediate registers 104 receive and store the approximate values AV from the significant digit detector 102. A combinatorial network 106, such as a lookup table (LUT), thereafter utilizes the approximate values AV stored in the intermediate registers 104 to generate an approximate result ARES, where this approximate result has a value that is an approximate value of a given operation, such as multiplication or division, on the operands OP provided to the significant digit detector. In this way, the approximation circuitry 100 utilizes only bitwise operations and a lookup table LUT to generate the approximate result ARES, which reduces the power consumption of the approximation circuitry in providing the approximate result compared to other typical circuitry for performing such operations, such as a microprocessor or microcontroller. This enables the inclusion of the approximation circuitry 100 in electronic devices having limited electrical power available, such as mobile devices, wearable devices, and Internet of things IoT devices.

In the present description, certain details are set forth in conjunction with the described embodiments to provide a sufficient understanding of the present disclosure. One skilled in the art will appreciate, however, that embodiments of the disclosure may be practiced without these particular details. Furthermore, one skilled in the art will appreciate that the present disclosure is not limited to the example embodiments described herein, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. The operation of well-known components and/or processes has not been shown or described in detail below to avoid unnecessarily obscuring the present disclosure. Finally, components that are common among the described embodiments are given the same reference numbers or descriptors in the present application even though the detailed operation of such components may vary among embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It also should be noted that the term "or" is generally employed in its sense including "and/or" unless the content clearly dictates otherwise.

Figure 2:
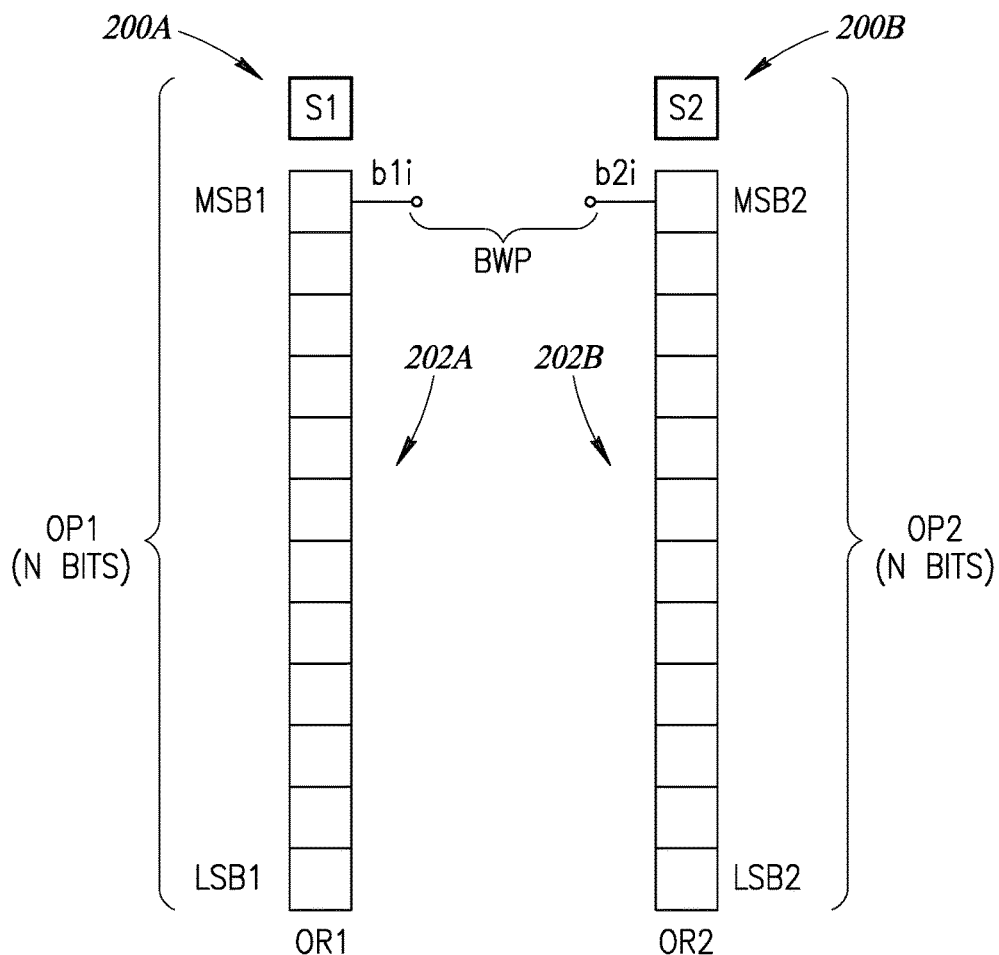
FIG. 2 is a functional block diagram illustrating first and second operand registers in a significant digit detector of FIG. 1 for storing first and second operands according to an embodiment of the present disclosure.

FIG. 2 is a functional block diagram illustrating first and second operand registers 200A, 200B contained in the significant digit detector 102 of FIG. 1 for storing a first operand OP1 and a second operand OP2 according to an embodiment of the present disclosure. The first operand register 200A is also designated as OR1 and the second operand register 200B also designated as OR2 in FIG. 2 and in the following description and remaining figures. In the example embodiment of the significant digit detector 102 described in the present application and illustrated in the figures, the significant digit detector receives first and second operands OP1, OP2. This embodiment operating on the two operands OP1, OP2 is described herein merely by way of example, and embodiments of the present disclosure are not limited to operating on only two operands. In other embodiments, the significant digit detector 102 receives three or more operands and detects the approximate most significant bit among these operands.

Each of the first and second operands OP1, OP2 is in signed-magnitude representation in the described embodiments of the present disclosure. Thus, each operand OP1, OP2 includes a sign bit S to indicate the sign, positive or negative, of a magnitude of a number represented by the remaining bits of the operand. Thus, in FIG. 2 the first operand OP1 includes a sign bit S1 and the remaining N bits of the first operand represent the magnitude of the number of the first operand. Similarly, the second operand OP2 includes a sign bit S2 and the remaining N bits of the second operand represent the magnitude of the number of the second operand. Each operand OP1, OP2 includes 12 bits, namely N=12, in the illustrated and described example embodiments in the present disclosure. Embodiments of the disclosure are, of course, not limited to operands OP1, OP2 where N=12, meaning having magnitudes that are 12 bits long, nor are they limited to the signed-magnitude representation—for example, a two's complement representation could be used instead.

Figure 3:
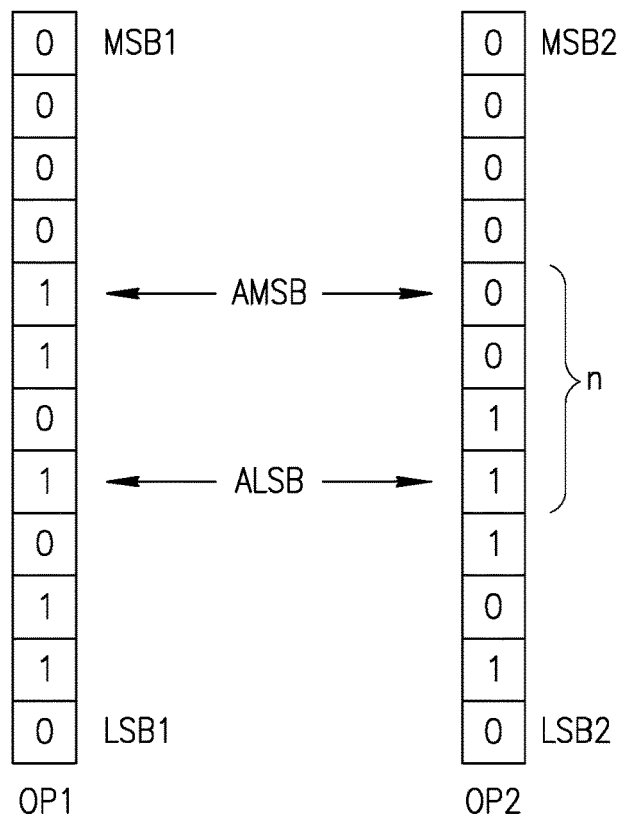
FIGS. 3 and 4 are functional diagrams illustrating the identification or detection of an approximate most significant bit in the first and second operands of FIG. 2.
Figure 4:
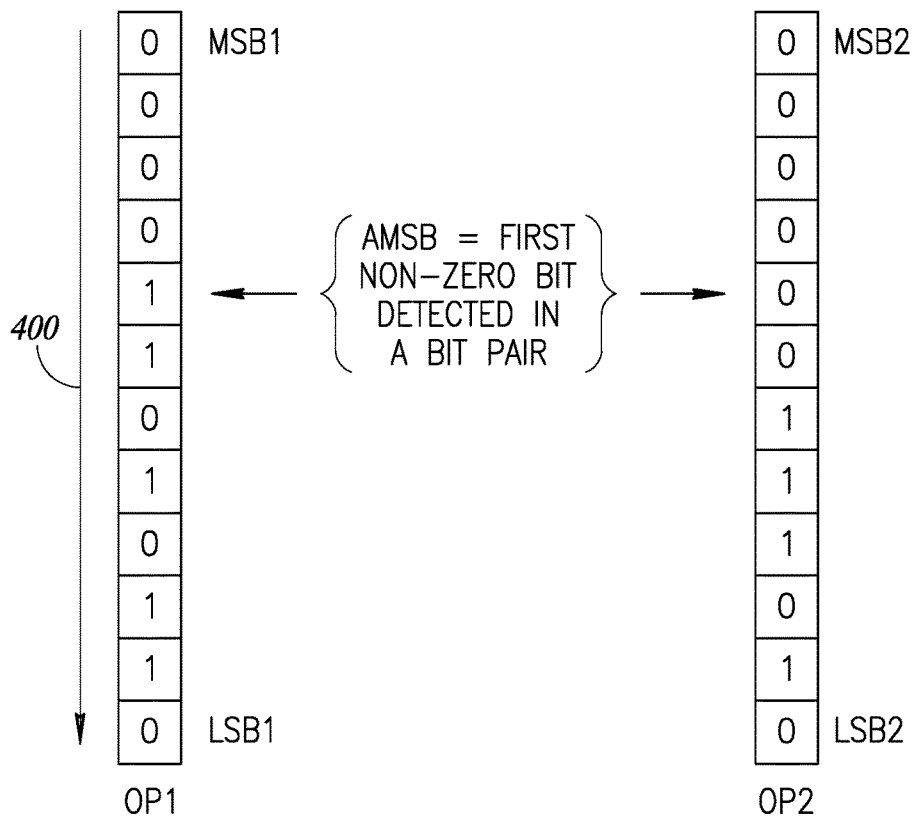

Even if each operand OP1, OP2 includes the sign bit S1, S2 and N-bits of the corresponding magnitude, in FIGS. 3-5 the sign bits S1, S2 are omitted and the operands are illustrated as corresponding to the N bits of the magnitude portion of each operand. This is done because the significant digit detector 102 of FIG. 1 processes the sign bits S1, S2 and the N-bit magnitudes of each operand OP1, OP2 separately, and FIGS. 3-5 deal with the processing of the N-bit magnitudes of the operands. The overall processing of the sign bits S1, S2 and N-bit magnitudes of the operands OP1, OP2 by the significant digit detector 102 are thereafter described in more detail below with reference to FIGS. 7 and 10. If no sign bit is used, the description of the processing of the N-bit magnitudes applies to the operands as a whole.

In the embodiment of FIG. 2, each of the operand registers 200A, 200B (OP1, OP2) includes a corresponding circular shift register 202A, 202B that stores the corresponding magnitude of the operand OP1, OP2. Each of the circular shift registers 202A, 202B includes an output bit storage location that stores a corresponding one of the N-bits of the magnitude of the corresponding operand OP1, OP2, and outputs this stored bit as the b1$i$, b2$i$ bit of the corresponding magnitude, where i is an index that has an integer value from N to 1. The bits b1$i$, b2$i$ stored in the output bit storage locations are collectively output from the circular shift registers 202A, 202B as a bitwise pair of bits BWP, as shown in FIG. 2. These bits may be referred to the bitwise pair of bits BWP or simply as the bitwise pair BWP in the present description.

In operation, the circular shift registers 202A, 202B circularly shift the N-bits of the magnitude stored in each register so that the bitwise pairs of bits BWP for the operands OP1, OP2 are sequentially output as bits b1$i$, b2$i$ of the bitwise pair of bits. The index i starts at the value N so that the initial bitwise pair of bits BWP output by the circular shift registers 201A, 202B is the bitwise pair of bits b1N, b2N corresponding to the most significant bit MSB1 of the first operand OP1 and the second most significant bit MSB2 of the second operand OP2. The most significant bits MSB1, MSB2 are considered the Nth bits of each of the operands OP1, OP2, and least significant bits LSB1, LSB2 of the operands as shown in FIG. 2 being considered the first bit of each operand.

After the most significant bits MSB1, MSB2 are output as the bitwise pair of bits BWP, the circular shift registers 202A, 202B then circularly shift the N-bits counterclockwise so that the bitwise pair of bits BWP is the pair of bits b1(N−1), b2(N−1), which corresponds to the (N−1)th bits of the operands OP1, OP2. The circular shift registers 202A, 202B then again circularly shift the N-bits counter clockwise so that the bitwise pair of bits BWP is the pair of bits b1(N−2), b2(N−2), which corresponds to the (N−2)th bits of the operands OP1, OP2. Thereafter, the circular shift registers 202A, 202B again circularly shift the N-bits counterclockwise to sequentially output the bits (N−3)rd, (N−4)th, and so on through the b11, b21 bits as the bitwise pair of bits BWP being output, which correspond to the least significant bits LSB1, LSB2. All bitwise pairs of bits BWP of the operands OP1, OP2 are not necessarily output by the circular shift registers 202A, 202B and compared by the significant digit detector 102. Instead, the significant digit detector 102 compares the bits b1$i$ and bit b2$i$ in each bitwise pair starting with the most significant bits MSB1, MSB2 until at least one of the bits of the bitwise pair of bits BWP is a non-zero bit, as will be described in more detail below.

Referring to FIGS. 3 and 4, these figures are functional diagrams illustrating the identification or detection of an approximate most significant bit AMSB in the first and second operands OP1, OP2 of FIG. 2, as will now be described in more detail. In the example of FIG. 3, the four most significant bits, which correspond to bits N, N−1, N−2 and N−3 (i.e., the 12$^{th}$ bit, 11$^{th}$ bit, 10$^{th}$ bit, and 9$^{th}$ bit since N=12) of each operand OP1, OP2 are all zeros. As a result, these bits may be ignored in calculating the approximate operation on the two operands OP1, OP2. Ignoring these most significant bits leaves fewer remaining bits of each operand OP1, OP2 that are used in the approximate operation being performed, which enables the approximation circuitry 100 to utilize a significantly smaller combinatorial network 106 for calculating the approximate result ARES, as will be described in more detail below. The approximate most significant bit AMSB is the first non-zero bitwise pair of bits BWP, which in the example of FIG. 3 is the bitwise pair of bits BWP of the bits b1(N−4), b2(N−4) (i.e., the 8$^{th}$ bits of operands OP1, OP2). This is true because the bit b1(N−4) of the first operand OP1 is a non-zero bit (i.e., is a logic 1 bit). In FIG. 4, this operation of the circular shift registers 202A, 202B (FIG. 2) is illustrated through the downward arrow 400, which indicates the bitwise pairs of bits BWP being sequentially output and compared to detect a non-zero bit starting with the most significant bits MSB1, MSB2, and then sequentially move downward toward the least significant bits LSB1, LSB2.

Preserving the information on the position of the AMSB within OP1 or OP2 may be important for some types of approximate operations, e.g. with additions or multiplications, where the order of magnitude of the result depends on the order of magnitude of the operands. Conversely, it is unnecessary, for example, with divisions, where the order of magnitude of the result depends just on the relative order of magnitude of the operands. In the former case, the position of the AMSB can be stored in a register and used to insert the result of the fewer-digit approximate operation into a larger register in the correct position, as will be described in more detail below.

Once the approximate most significant bit AMSB of the operands OP1, OP2 has been detected, the significant digit detector 102 thereafter stores the approximate values AV for the operands OP1, OP2 in the intermediate registers 104 of FIG. 1. More specifically, the significant digit detector 102 stores as the approximate value AV of each operand OP1, OP2, the approximate most significant bit AMSB of the operand and a selected number of less significant bits relative to detected the AMSB bit. The selected number of less significant bits is determined by an approximation depth n utilized by the approximation circuitry 100. The approximation depth n determines the total number of bits of each operand OP1, OP2 to be stored as approximate values AV in the intermediate registers 104. FIG. 3 illustrates the approximation depth n=4 in the example embodiment being described. Thus, each of the approximate values AV to be stored in the intermediate registers 104 includes four (4) of the bits of the corresponding operand OP1, OP2.

Each of bits of each operand OP1, OP2 is in an ith position within the operand, where i is an index from N to 1 and i=N for the most significant bit MSB1, MSB2 of each operand in the Nth bit position of the operand, and i=1 for the least significant bit LSB1, LSB2 in the first bit position of the operands. The significant digit detector 102 detects the approximate most significant bit AMSB of the operands OP1, OP2 is at an $I_{th}$ bit position of each operand, where I is less than or equal to N and is the value of the index i for the bit position of the AMSB bit. In the example of FIGS. 3 and 4, the AMSB bit is at the I=$8^{th}$ bit (i=8) of each operand OP1, OP2. Once the significant digit detector 102 has detected the AMSB bit, the detector stores the Ith bit through the (I−(n−1))th bit of each operand OP1, OP2 in the intermediate registers 104, where n is the approximation depth. As described above, the approximation depth n defines the number of less significant bits, relative to the AMSB bit, and total number of bits of each operand OP1, OP2 that are stored for the approximate values AV in the intermediate registers.

Figure 5A:
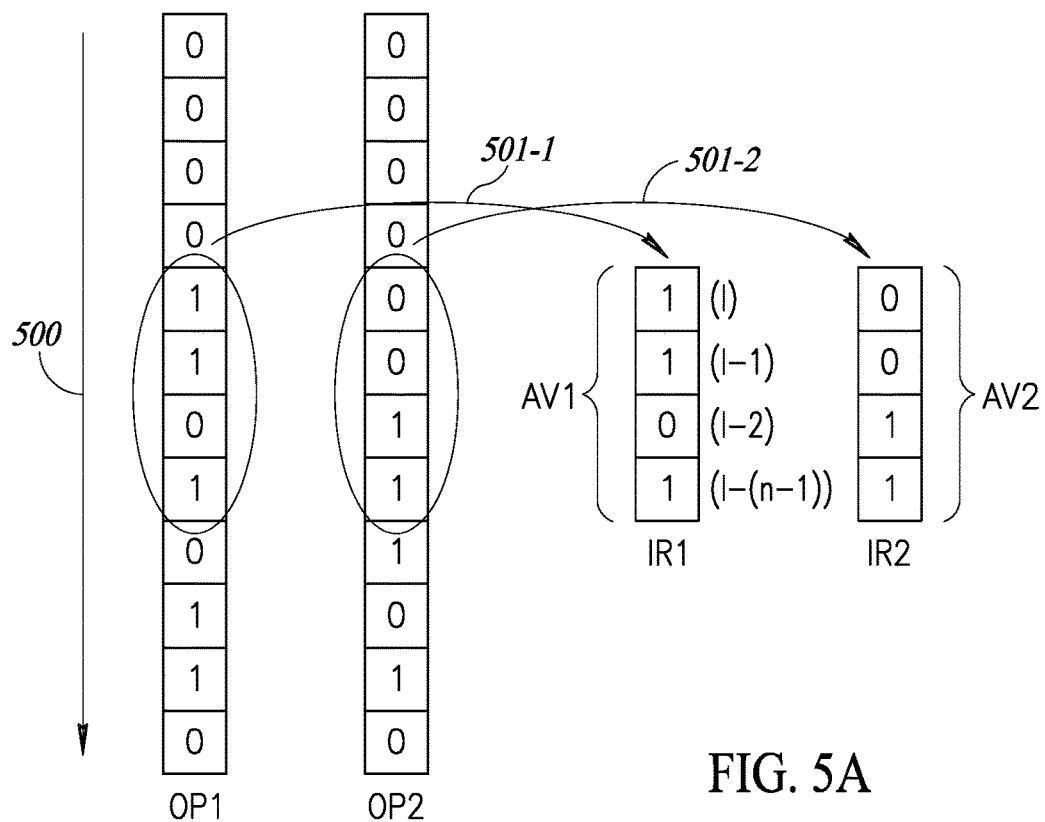
FIG. 5A illustrates the storage of first and second approximate values of the first and second operands based on the detected approximate most significant bit of FIGS. 3 and 4 in first and second intermediate registers contained in the intermediate registers of FIG. 1.

FIG. 5A illustrates the storage of the approximate values AV in the intermediate storage registers 104. More specifically, FIG. 5A shows a first approximate value AV1 for the first operand OP1 being stored in a first intermediate register IR1 and a second approximate value for the second operand being stored in a second intermediate register IR2. The first and second intermediate registers IR1, IR2 correspond to the intermediate registers 104 of FIG. 1 in the example being described. Each of the first and second approximate values AV1, AV2 includes the Ith bit, (I−1)th bit, (I−2)th bit, and (I−(n−1))th bit of the first and second operands OP1, OP2. The approximation depth n=4 and thus each of the first and second approximate values AV1, AV2 includes 4 bits in the example embodiment being described. The significant digit detector 102 stores the n bits of the approximate values AV1, AV2 in the intermediate registers IR1, IR2 in the same relative positions as in the operands OP1, OP2. Thus, the approximate most significant bit AMSB of each operand OP1, OP2 is stored in the most significant bit location corresponding approximate value AV1, AV2. This is illustrated in FIG. 5A through the circled bits and arrows 501-1, 501-2 for the selected bits in the operands OP1, OP2 and corresponding bits forming the approximate values AV1, AV2 in the intermediate registers IR1, IR2.

Since the content of the two intermediate registers altogether or collectively is the input or entry for the subsequent approximate calculation block (e.g. a look-up table), the approximate values may be stored in the two intermediate registers IR1, IR2 either in an indifferent order (if the operation is commutative, e.g. addition or multiplication) or in an ordered fashion (e.g. for division, calculation of arctangent, and so on). In case the order is indifferent, a convenient solution is to store in one of the two registers IR1, IR2, (e.g., in IR1) the approximate value featuring a 1 bit in the AMSB position, that is the larger of the two approximate values if the other approximate value has a 0 bit in the AMSB position, or either of the two approximate values if both approximate values have a 1 bit in the AMSB position. This guarantees that the most significant bit of the chosen register (e.g., register IR1 in this example) is a 1 bit, which halves or cuts in half the number of required entries in the look-up table. Conversely, in case the operation to be approximated is commutative, the approximate values must be stored in the intermediate registers in a predetermined ordered fashion, irrespective of the AMSB values.

Figure 5B:
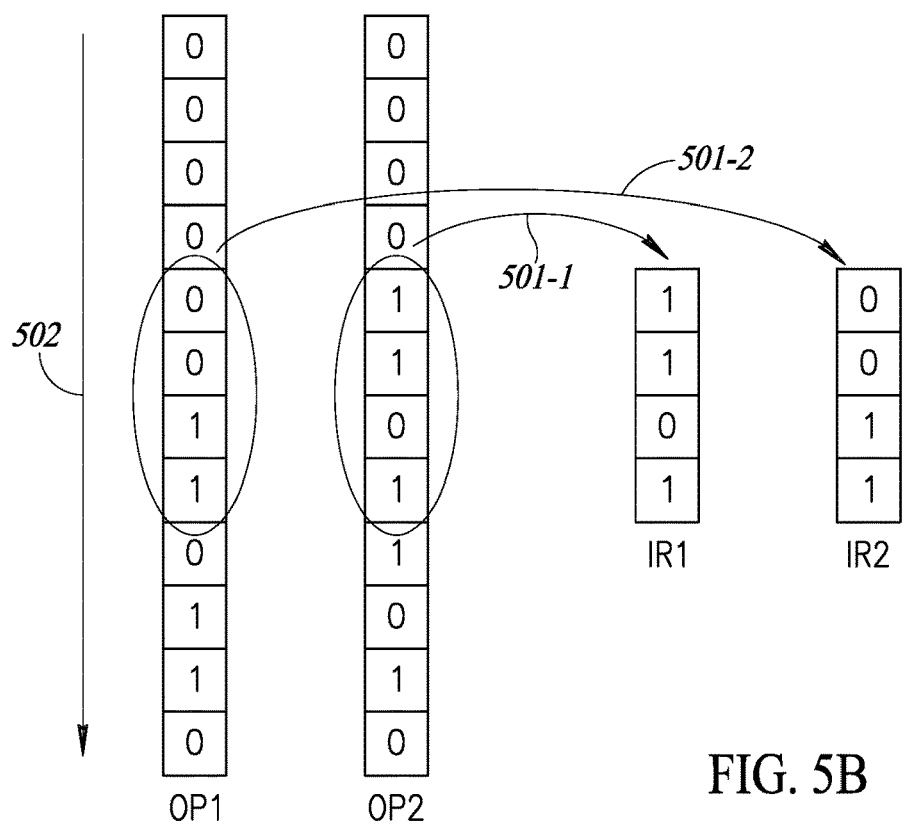
FIG. 5B illustrates the storage of the larger one of the first and second approximate values in the first intermediate register and the smaller one of the first and second approximate values in the second intermediate register.

As seen in FIG. 5A, the first approximate value AV1 of the operand OP1 is stored in the intermediate register IR1. This may correspond to either of the two situations described above, namely either the significant digit detector 102 operates to store the approximate values AV according to a fixed register-to-intermediate register correspondence for a non-commutative operation to be carried out, or for a commutative operation the significant digit detector 102 operates to store the larger one of the operands OP1, OP2 in the first intermediate register IR1 and the smaller of the operands in IR2. More precisely for a commutative operation, storing the approximate value AV1, AV2 (or either of the values AV1, AV2) featuring a 1 bit in the AMSB position in register IR1, and the other in register IR2. In the latter case, the approximate value with a 1 bit in the AMSB position is AV1, which is then stored in IR1. The approximate value AV2 does not have a zero in the Ith bit position and is accordingly store in register IR2. FIG. 5B also illustrates this operation, where the values for the two operands OP1, OP2 have been reversed so that the operand OP1 is the smaller operand and operand OP2 is the larger operand. As seen in FIG. 5B, in this situation the first approximate value AV1 stored in intermediate register IR1 is the corresponding bits from the larger operand OP2, as illustrated by the circle and arrow 501-1. The second approximate value AV2 stored in intermediate register IR2 is the corresponding bits from the smaller operand OP1, as illustrated by the circle and arrow 501-2. This is the preferred case when the operation is commutative.

Figure 6:
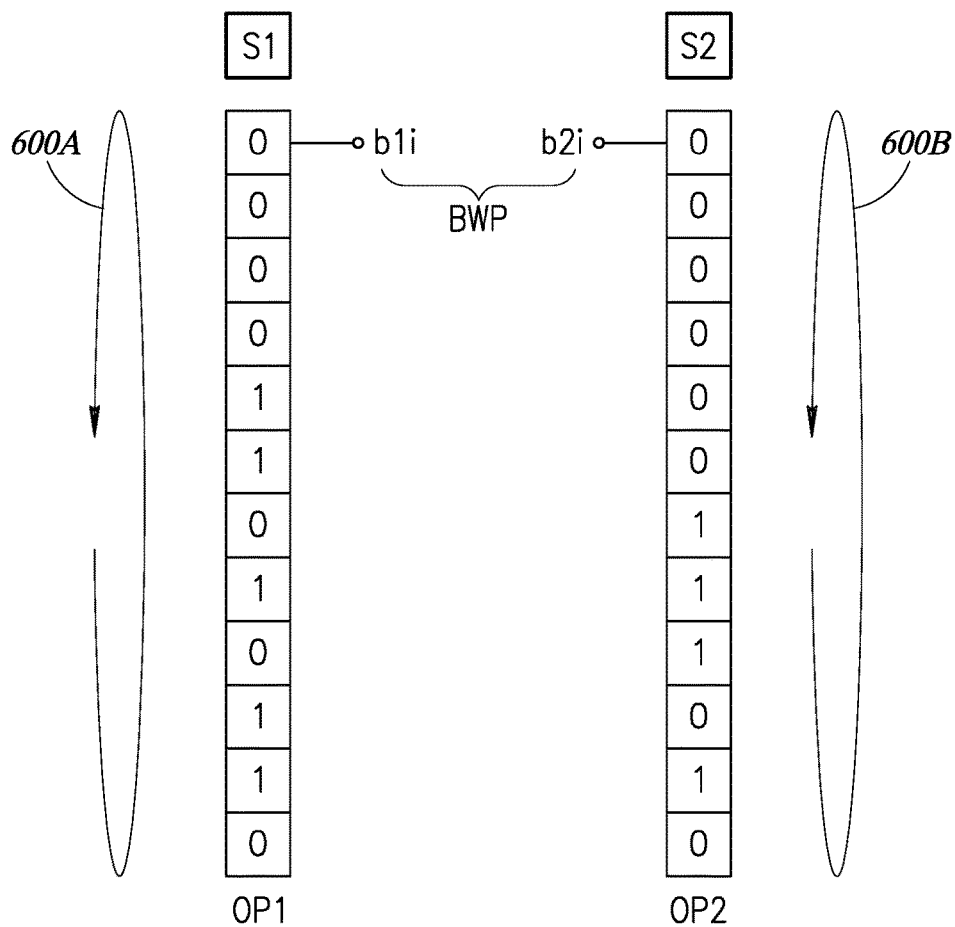
FIG. 6 is a functional block diagram illustrating the counterclockwise circular shifting of the first and second operand registers of FIG. 2.

FIG. 6 is a functional block diagram illustrating the counterclockwise circular shifting of the first and second operand registers OP1, OP1 of FIG. 2. This counterclockwise circular shifting is represented through arrows 600A, 600B. This circular shifting sequentially shifts bitwise pairs of bits BWP (b1$i$, b2$i$) as outputs for determining the approximate most significant bit AMSB of the operands OP1, OP2, and for shifting the required bits of these operands into the intermediate shift registers IR1, IR2.

Figure 7A:
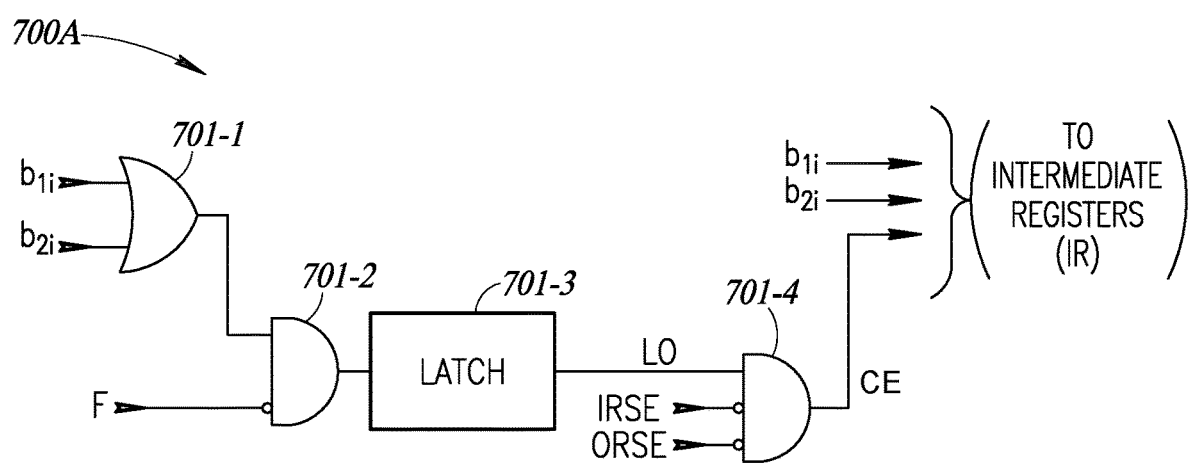
FIG. 7A is a schematic diagram of an embodiment of the significant digit detector of FIG. 1 for detecting the approximate most significant bit of the first and second operands where the operation being performed is not commutative, and for routing the required bits of these operands that form the approximate value of each operand to the first and second intermediate registers.
Figure 7B:
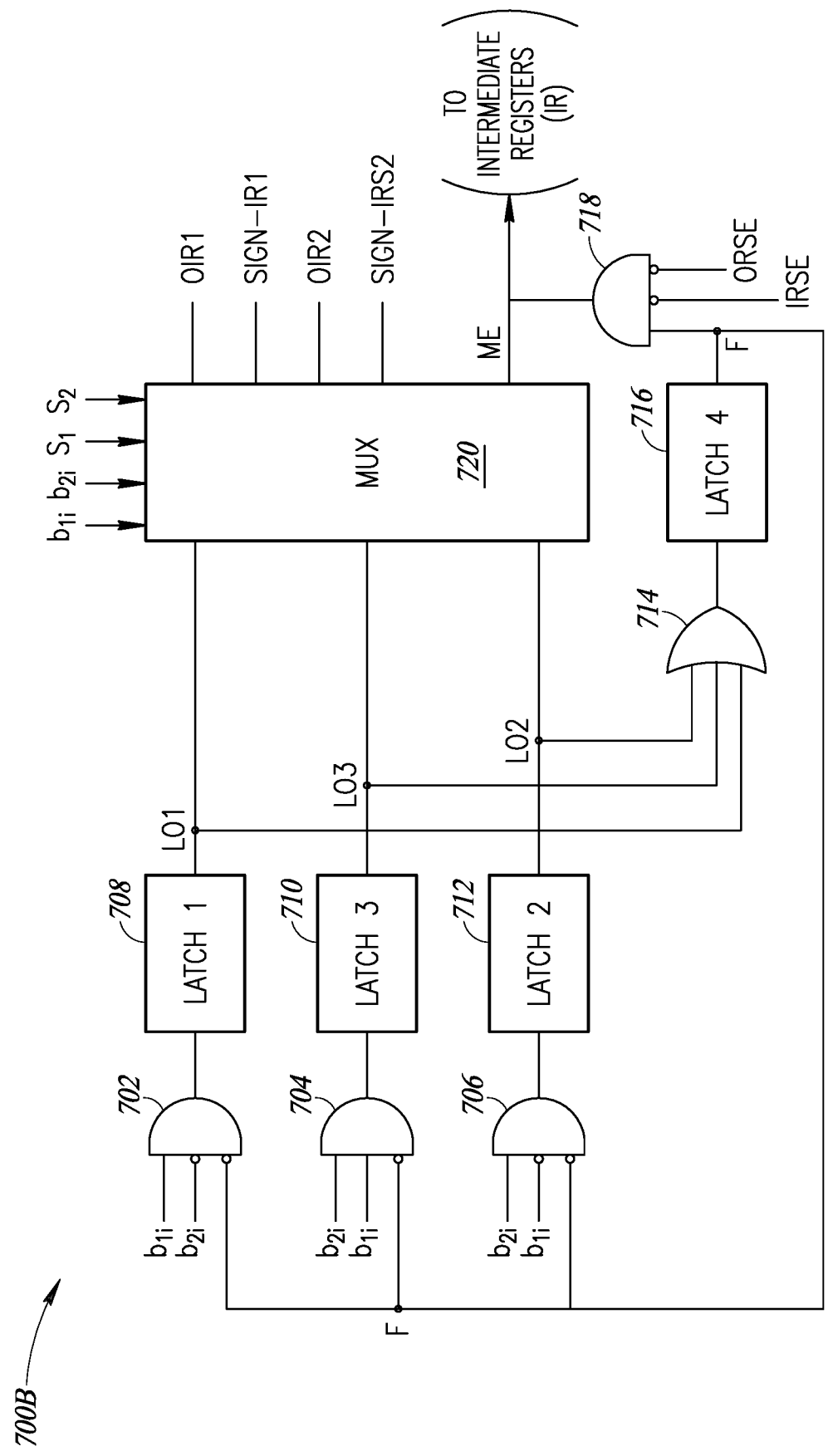
FIG. 7B is an embodiment of the significant digit detector of FIG. 1 where the operation being performed is commutative according to another embodiment of the present disclosure.

FIGS. 7A and 7B show two possible schematic diagrams of a significant digit detector 700A, 700B for detecting the approximate most significant bit AMSB of the first and second operands OP1, OP2 and for routing the required bits of these operands that form the approximate values AV1, AV2 of the operands to the first and second intermediate registers IR1, IR2, as will now be described in more detail. The schematic in FIG. 7A applies to the case when the approximate operation is not commutative so that the appropriate bits of each of the operands OP1, OP2 must be copied into the intermediate registers IR1, IR2 in the proper order. FIG. 7B, conversely, applies to the case of a commutative approximate operation, in which the order of the operands is unimportant, so that copying the AMSB into a fixed operand intermediate register IR1, IR2,(e.g., IR1) guarantees a smaller look-up table.

In FIG. 7A, the significant digit detector 700A is one embodiment of the detector 102 previously described with reference to FIGS. 1-6. The detector 700A includes a digital logic gate 701-1, which is an OR gate, that receives on a first input the bit b1$i$ of the first operand OP1 in the bitwise pair of bits BWP being output. The OR gate 701-1 also receives on a second input the bit b2$i$ of the second operand OP2 in the bitwise pair of bits BWP being output.

A second logic gate 701-2, which is an AND gate, receives on a first input the output of the OR gate 701. The AND gate 701-2 also receives on a second input, which is a low true input in this embodiment, a finish signal F that enables or disables the gate as a function of whether the approximate most significant bit AMSB has been detected, as will be described in more detail below.

A latch 701-3 is coupled to receive the gate output from the AND gate 701-2 and is configured to drive a latch output LO active in response to the gate 701-2 output being active. An AND gate 701-4 receives on one input the LO signal and receives an Intermediate Register Shift End (IRSE) signal and an Operand Register Shift End (ORSE) signal on second and third low true inputs, respectively. The IRSE signal comes from the intermediate operand registers IR1, IR2 and forces the output of AND gate 701-4 to a low state as soon as the intermediate operand registers IR1, IR2 have undergone a complete rotation. The ORSE signal comes from the operand registers OP1, OP2 and forces the output of the AND gate 701-4 low as soon as the operand registers have undergone a complete rotation.

The AND gate 701-4 also generates an output copy enable signal (CE) which allows the rotation of the intermediate registers IR1, IR2 and the copying of the operand bits into the proper position of the intermediate registers. As soon as either the operand registers OP1, OP2 or the intermediate operand registers IR1, IR2 have undergone a complete rotation, the AND gate 701-4 drives the CE signal inactive or false and the copying of bits of the operands OP1, OP2 into the registers IR1, IR2 (and register rotation) are disabled.

The detector 700B, in FIG. 7B, is another embodiment of the detector 102 previously described with reference to FIGS. 1-6. The detector 700B includes a first digital logic gate 702, which is an AND gate, that receives on a first input the bit b1$i$ of the first operand OP1 in the bitwise pair of bits BWP being output. The AND gate 702 also receives on a second input, which is a low true input in this embodiment, the bit b2$i$ of the second operand OP2 in the bitwise pair being output. A third input of the AND gate 702 receives a finish signal F that enables or disables the gate as a function of whether the approximate most significant bit AMSB has been detected, as will be described in more detail below. The AND gate 702 generates a first gate output that is active in response to the bit b1$i$ of the first operand OP1 in the bitwise pair BWP being a non-zero bit (i.e., a logic 1) and the bit b2$i$ of the second operand OP2 in the bitwise pair being a zero bit applied to the low true input of the AND gate. Thus, the first gate output is active if the first operand OP1 is greater than the second operand OP2. This is true when the F signal is active, namely is low in the embodiment of FIG. 7.

A second digital logic gate 704, which is an AND gate, receives on a first input the bit b1$i$ of the first operand OP1 in the bitwise pair BWP being output and the bit b2$i$ of the second operand OP2 in the bitwise pair being output, and receives the F signal on a third low true input. The AND gate 704 generates a second gate output that is active in response to the bit b1$i$ of the first operand in the bitwise pair BWP being a non-zero bit and the bit b2$i$ of the second operand OP2 in the bitwise pair being a non-zero bit. Thus, the second gate output is active if both the approximate most significant bit AMSB of each of the first and second operands OP1, OP2 is a non-zero bit (i.e., both bits b1$i$, b2$i$ in the bitwise pair BWP are logic 1) and the signal F is active, namely is low.

A third digital logic gate 706, which is an AND gate, receives as first input the bit b2$i$ of the second operand OP2 in the bitwise pair BWP being output and receives a second low true input the bit b1$i$ of the first operand OP1 in the bitwise pair being output, and receives the F signal on a third low true input. The AND gate 706 generates a third gate output that is active in response to the bit b1$i$ of the first operand OP1 in the bitwise pair BWP being a zero bit and the bit b2$i$ of the second operand in the bitwise pair being a non-zero bit. Thus, the third gate output is active if the second operand OP2 is greater than the first operand OP1, and the signal F is active, namely is low.

A first latch 708 is coupled to receive the first gate output from the AND gate 702 and is configured to drive a first latch output LO1 active in response to the first gate output being active. A second latch 710 is coupled to receive the second gate output from the AND gate 704 and is configured to drive a second latch output LO2 active in response to the second gate output being active. A third latch 712 is coupled to receive the third gate output from AND gate 706 and is configured to drive a third latch output LO3 active in response to the third gate output being active. In operation of the significant digit detector 700B, each of the latches 708-712 is initially reset, causing the latch outputs LO1, LO2 and LO3 to initially be set to be inactive, which is logic 0 in this illustrated embodiment.

A fourth latch 716 is coupled to receive the output of the OR gate 714 and is configured to drive the finish signal F, which is supplied to an AND gate 718 and back to inputs of the AND gates 702, 704, and 706 as described above. The finish signal F becomes true as soon as the AMSB is found in either operand OP1, OP2.

The AND gate 718 receives as a first input the signal F, and has a second and a third low true inputs that receive two signals. The first signal is the Intermediate Register Shift End (IRSE) that comes from the intermediate operand registers IR1, IR2 and forces the output of AND gate 718 low as soon as the intermediate operand registers have undergone a complete rotation. The second signal is the Operand Register Shift End (ORSE) that comes from the operand registers OR1, OR2 and forces the output of AND gate 718 low as soon as the operand registers have undergone a complete rotation. The AND gate 718 drives a Multiplexer Enable (ME) output signal which, when true, enables the operation of multiplexer 720 as described below. The ME signal also enables the rotation of the intermediate registers IR1, IR2. As soon as the AMSB is detected, the finish signal F becomes true, the AND gate 718 drives the ME signal true and the multiplexer is thereby enabled, and the intermediate registers IR1, IR2 are allowed to rotate bits in these registers. The most significant bits of the operands OP1, OP2 are then written into the intermediate register IR1, IR2 in the proper order, while both they and the operand registers are shifted by 1 position after each bit pair has been written. The copying of the appropriate bits from the operands OP1, OP2 into the intermediate registers IR1, IR2 is disabled after a complete rotation cycle of either the operands or the intermediate registers has been carried out. This ensures that, after a maximum number of clock ticks, the approximate values AV of the operands OP1, OP2 have been stored into the intermediate registers IR1, IR2.

A multiplexer 720 is coupled to receive the first, second and third latch outputs LO1, LO2, and LO3 and to receive the bitwise pair of bits b1$i$, b2$i$ being output from the operand registers OP1, OP2 (i.e., from the first and second circular shift registers 202A, 202B of FIG. 2). In operation, the multiplexer is configured to store each bit b1$i$, b2$i$ of the bitwise pair of bits BWP in the appropriate one of the first and second intermediate registers IR1, IR2 in response to one of the first latch output LO1, second latch output LO2, and third latch output LO3 being active. More specifically, the multiplexer 720 routes the bit b1$i$, b2$i$ of the bitwise pair BWP of the larger one of the first and second operands OP1, OP2 to a first intermediate register output OIR1 and routes the bit b1$i$, b2$i$ of the bitwise pair BWP of the smaller one of the first and second operands to a second intermediate register output OIR2. The multiplexer 720 also receives the first and second sign bits S1, S2 and routes the first sign bit S1 of the first operand OP1 to the appropriate one of a first sign bit output SIGN-IR1 and a second sign bit output SIGN-IR2, and to route the second sign bit S2 of the second operand to the other one of the first and second sign bit outputs.

Figure 8:
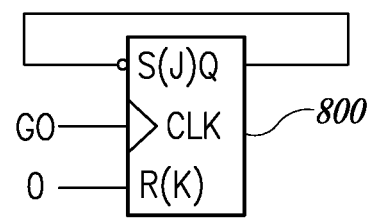
FIG. 8 is a more detailed schematic of one embodiment of each of the latches of the significant digit detector of FIG. 7.

FIG. 8 is a more detailed schematic of one embodiment of the latch 701-3 of FIG. 7A as well as each of the latches 708-712 of the significant digit detector 700B of FIG. 7B. As shown in FIG. 8, each of the latches 701-3 or 708-712 may be formed by either a SR latch or a JK flip-flop circuit 800 having an output Q of the device coupled to the set input S or input J of the device. The R input or K input of the circuit 800 receives an inactive signal, which in the illustrated example is a logic 0 level signal. A clock input CLK of the circuit 800 receives a gate output GO corresponding to the output from the corresponding one of the AND gates (respectively 701-2 or 702-706) coupled to the circuit. In operation of the significant digit detectors 700A and 700B, the reset signal applied to the R or K input is initially activate to reset the circuit 800, causing the circuit to drive the output Q inactive low to a zero logic level in the described embodiment. Thereafter, in response to the GO output going active, which clocks the circuit 800, the circuit drives the output Q active to a logic 1 level in the embodiment of the significant digit detectors 700A and 700B of FIGS. 7A and 7B, respectively.

Figure 9:
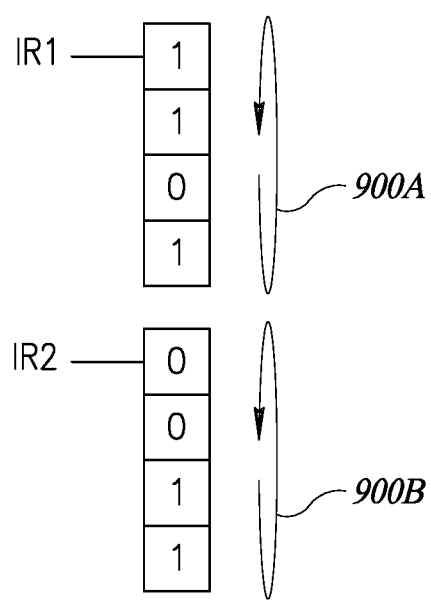
FIG. 9 illustrates the operation of the multiplexor of FIG. 7 in circularly rotating the required bits of the first and second operands forming the first and second approximate values into the first and second intermediate registers according to an embodiment of the present disclosure.

FIG. 9 illustrates the operation of the multiplexor of FIG. 7B in circularly rotating the required bits b1$i$, b2$i$ of the first and second operands OP1, OP2 forming the first and second approximate values AV1, AV2 into the first and second intermediate registers IR1, IR2 according to an embodiment of the present disclosure. As arrows 900A and 900B indicate, the n bits of each of the approximate value AV1, AV2 are shifted into the registers IR1, IR2 as they are shifted out of the operand registers OR1, OR2 so that the relative positions of the corresponding n bits in the operands OR1, OR2 are maintained in the registers IR1, IR2.

Figure 10:
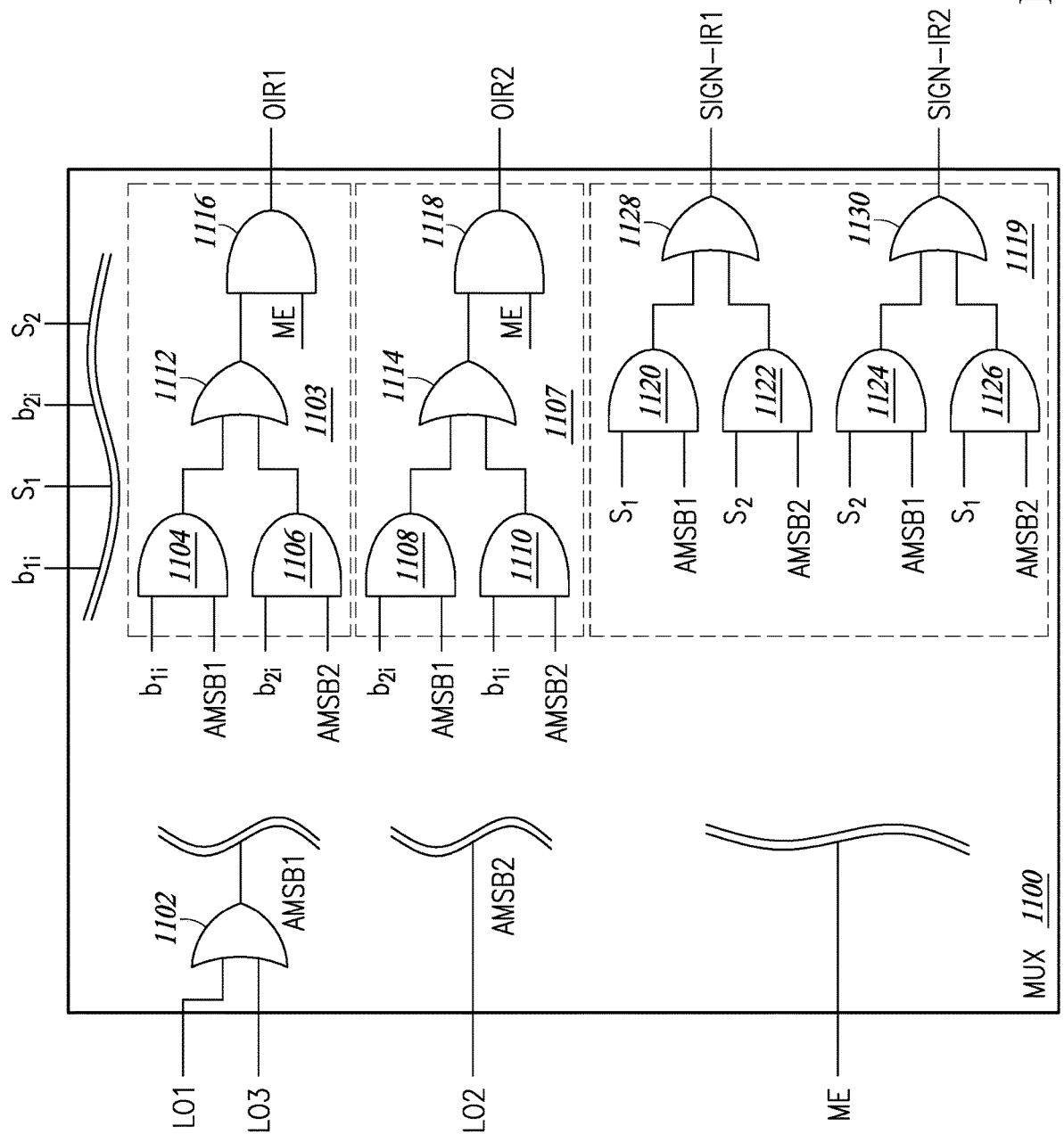
FIG. 10 is a more detailed schematic of the multiplexor of FIG. 7 according to an embodiment of the present disclosure.

FIG. 10 is a multiplexer 1100 which is a more detailed schematic of the multiplexor 720 of FIG. 7B according to an embodiment of the present disclosure. The multiplexer 1100 includes a first OR gate 1102 coupled to receive the first and third latch outputs LO1, LO3 and configured to generate a first approximate most significant bit signal AMSB1 responsive to the first and third latch outputs. If the LO1 output is active the approximate most significant bit AMSB has been detected and the operand OP1 is the larger operand and the corresponding bit b1$i$ of the bitwise pair BWP is a non-zero bit, or if the LO3 output is active both the b1$i$, b2$i$ bits of the bitwise pair BWP are non-zero bits, and thus the AMSB1 signal is true or active in either of these situations. A node of the multiplexer 1100 receives the second latch output LO2, which is true or active when the approximate most significant bit AMSB is detected and the bit b2$i$ of the second operand OP2 is a non-zero bit while the bit b1$i$ of operand OP1 is a zero bit so that the second operand is larger than the first operand. The LO2 output is distributed as a second approximate most significant bit AMSB2 signal in the multiplexer 1100.

A first logic circuit 1103 is configured to receive the bitwise pair of bits BWP (i.e., bits b1$i$, b2$i$), the first approximate most significant bit signal AMSB1 and the second most significant bit signal AMSB2, and is configured to route the bit b1$i$ or b2$i$ of the bitwise pair BWP of the larger one of the first and second operands OP1, OP2 to the first intermediate register output OIR1. A second logic circuit 1107 is configured to receive the bitwise pair of bits BWP, the first approximate most significant bit signal AMSB1 and the second most significant bit signal AMSB2, and the second logic circuit is configured to route the bit of the bitwise pair b1$i$ or b2$i$ of the smaller one of the first and second operands OP1, OP2 to a second intermediate register output OIR2. Finally, a third logic circuit 1119 is configured to receive the first approximate most significant bit signal AMSB1, the second most significant bit signal AMSB2, and the first and second sign bits S1, S2, and is configured to route the appropriate sign bit S1 or S2 of the first or second operand OP1, OP2 to the first intermediate register sign bit output SIGN-IR1, and to route the appropriate sign bit S1 or S2 of the first or second operand OP1, OP2 to the second intermediate register sign bit output SIGN-IR2.

In the embodiment of FIG. 10, the first logic circuit 1103 includes a first AND gate 1104 having a first input coupled to receive the bit b1$i$ of the first operand OP1 in the bitwise pair BWP and a second input coupled to receive the first approximate most significant bit signal AMSB1, and having a first output. A second AND gate 1106 has a first input coupled to receive the bit b2$i$ of the second operand OP2 in the bitwise pair BWP and a second input coupled to receive the second approximate most significant bit signal AMSB2, and having a second output. A second OR gate 1112 has first and second inputs coupled to the first and second outputs of the first and second AND gates 1104, 1106, respectively, and has an output. A third AND gate 1116 has a first input coupled to the output of the second OR gate 1112 and a second input coupled to receive a multiplexer enable signal ME, and has a third output coupled to the first intermediate register output OIR1.

In the embodiment of FIG. 10, the second logic circuit 1107 includes a fourth AND gate 1108 having a first input coupled to receive the bit b2$i$ of the second operand OP2 in the bitwise pair BWP and a second input coupled to receive the first approximate most significant bit signal AMSB1, and has a fourth output. A fifth AND gate 1110 has a first input coupled to receive the bit b1$i$ of the first operand OP1 in the bitwise pair BWP and a second input coupled to receive the second approximate most significant bit signal AMSB2, and has a fifth output. A third OR gate 1114 has first and second inputs coupled to the fourth and fifth outputs of the fourth and fifth AND gates 1108, 1110, respectively, and has an output. A sixth AND gate 1118 has a first input coupled to the output of the third OR gate 1114 and a second input coupled to receive the multiplexer enable signal ME, and has a sixth output coupled to the second intermediate register output OIR2.

The third logic circuit 1119 in the embodiment of FIG. 10 includes a seventh AND gate 1120 having a first input coupled to receive the first sign bit S1 of the first operand OP1 and a second input coupled to receive the first approximate most significant bit signal AMSB1, and has a seventh output. An eighth AND gate 1122 has a first input coupled to receive the second sign bit S2 of the second operand OP2 and a second input coupled to receive the second approximate most significant bit signal AMSB2, and has an eighth output. A fourth OR gate 1128 has a first input coupled to the seventh output and a second input coupled to the eight output of the AND gates 1120, 1122, and has a fourth output coupled to the first sign bit output SIGN-IR1. A ninth AND gate 1124 has a first input coupled to receive the second sign bit S2 of the second operand OP2 and a second input coupled to receive the first approximate most significant bit signal AMSB1, and has a ninth output. A tenth AND gate 1126 has a first input coupled to receive the first sign bit S1 of the first operand OP1 and a second input coupled to receive the second approximate most significant bit signal AMSB2, and has a tenth output. A fifth OR gate 1130 has a first input coupled to the ninth output and a second input coupled to the tenth output of the AND gates 1124, 1126, and has a fifth output coupled to the second sign bit output SIGN-IR2.

Figure 11:
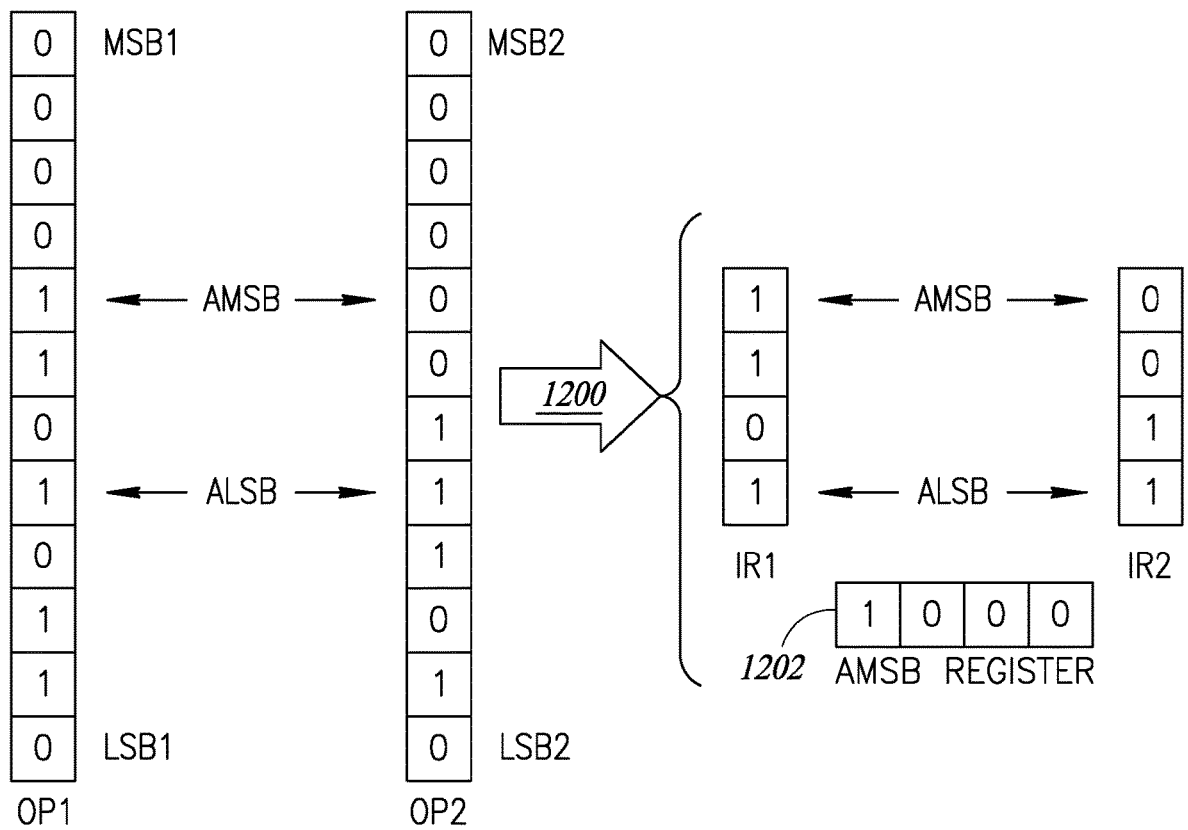
FIG. 11 is a functional diagram illustrating the overall operation of the significant digit detector and intermediate registers of FIGS. 1-10 in storing the first and second approximate values of the first and second operands in the first and second intermediate registers.

FIG. 11 is a functional diagram illustrating the overall operation of the significant digit detector 102 and intermediate registers 104 of FIGS. 1-10 in storing the first and second approximate values AV1, AV2 of the first and second operands OP1, OP2 in the first and second intermediate registers IR1, IR2. An arrow 1200 illustrates this transfer or routing of the appropriate bits in the operands OP1, OP2 to the intermediate registers IR1, IR2 to thereby store the first and second approximate values AV1, AV2 in these intermediate registers. In addition, the significant digit detector 102 also stores the location of the location or position of the approximate most significant bit AMSB in each of the operands OP1, OP2. This is illustrated in FIG. 11 in the form of an AMSB register 1202 that stores the location of the AMSB in the operands OP1, OP2. In the example illustrated in FIG. 11, the AMSB of the operands OP1, OP2 is in the eight bit position or location of the operands. Thus, the AMSB register 1202 stores the value eight (8) in binary, which is shown in FIG. 11 as the value "1000" where the right-most bit location in the AMSB register 1202 is the least significant bit of this value.

Figure 12:
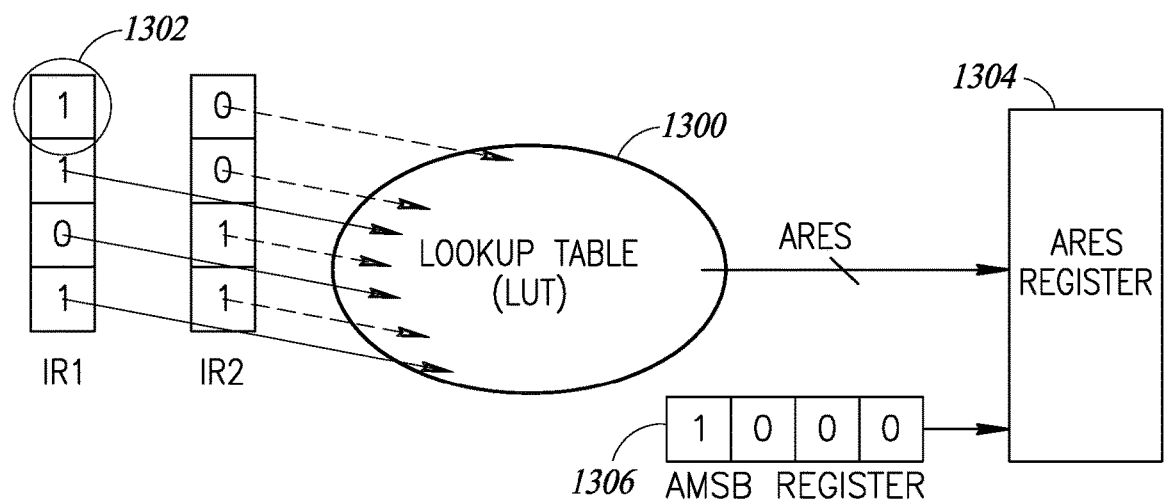
FIG. 12 is a functional diagram illustrating the operation of the combinatorial network of FIG. 1 in generating an result from the first and second approximate values stored in the first and second intermediate registers.

FIG. 12 is a functional diagram illustrating the operation of the combinatorial network 106 of FIG. 1 in generating the approximate result ARES from the first and second approximate values AV1, AV2 stored in the first and second intermediate registers IR1, IR2. In the embodiment of FIG. 12, the combinatorial network 106 is a lookup table (LUT) 1300. In operation, the first and second approximate values AV1, AV2 are supplied to the LUT 1300 which, using these two values, generates the corresponding approximate result ARES. The approximate result ARES is stored in an approximate results register 1304. As shown in FIG. 12, the most significant bit of the first approximate value AV1 stored in intermediate register IR1, which highlighted by circle 1302, is a non-zero bit (logic 1). This will always be the case in the above-described embodiments of the detector 102 and intermediate registers IR1, IR2 when the approximate operation to be carried out is commutative. In such cases, this bit of the approximate value AV1 stored in register IR1 can be ignored and the LUT 1300 accordingly simplified. In the illustrated example, the LUT 1300 need only include $2^7$ entries instead of $2^8$ since the most significant bit of the approximate value AV1 can be ignored since it is always a non-zero bit.

Figure 13A:
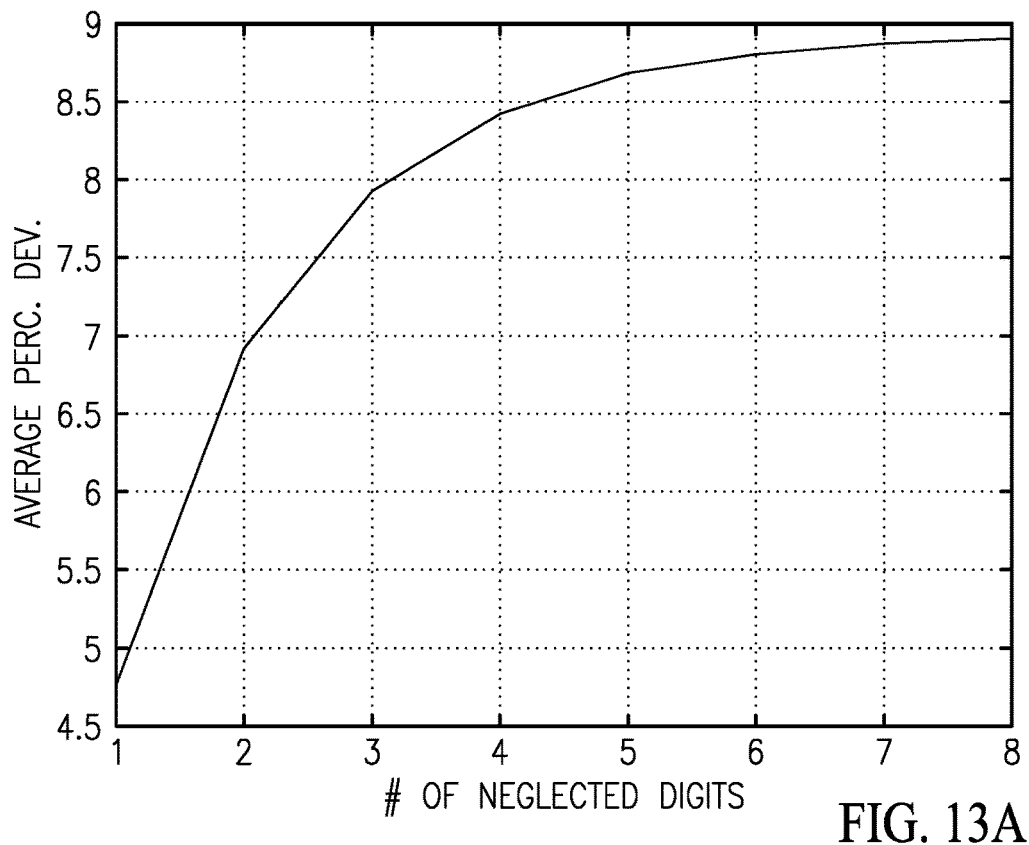
FIGS. 13A and 13B show an example of the average and maximum percentage deviations of the result as a function of the number of the ignored or neglected bits in the first and second operands for the approximation circuitry of FIG. 1.
Figure 13B:
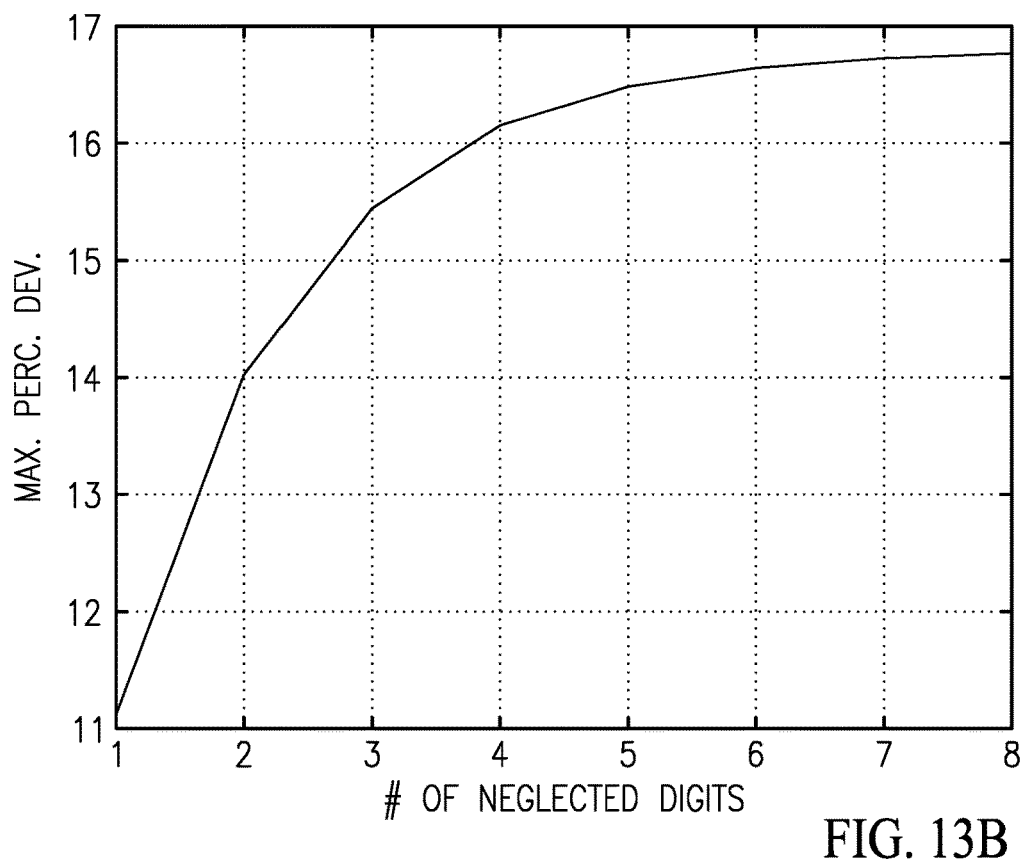

In addition, the approximation circuitry 100 adjusts a value of the approximate result of the operation based on the type of operation and based on a number IB of bits of each of the first and second operands OP1, OP2 not included in the corresponding first and second approximate values AV1, AV2, where the number IB is equal to the location of the AMSB bit (i.e., the Ith bit in the above description) minus the approximate depth n (i.e., IB=(I−n). This adjustment will be different depending on the type of operation being performed. For example, where a multiplication of the operands OP1, OP2 is being performed an adjustment will be necessary whereas when a division of the operands OP1, OP2 is being performed no such adjustment is required. FIG. 12 illustrates this adjustment in the form an AMSB register 1306 that stores the position of the approximate most significant bit AMSB in the operands OP1, OP2, as described above for the AMSB register 1202 in FIG. 11. FIGS. 13A and 13B show the average and maximum percentage deviations of the result ARES as a function of the number of the ignored or neglected bits in the first and second operands for the approximation circuitry 100 of FIG. 1 for an example operation (namely, the example operation being the calculation of the magnitude of a vector starting from its two component vectors). The example illustrated approximates the classical calculation formula based on the Pythagorean theorem, starting from the x and y components of the vector. In the described example embodiment, four bits are neglected or ignored as seen in referring back to FIGS. 5A and 5B. More specifically, in the operands OP1, OP2 the four least significant bits are ignored or not used as part of the approximate values AV1, AV2 stored in the intermediate registers IR1, IR2. This is what makes the approximate result ARES only an approximate value, with FIGS. 13A and 13B showing the effect on the accuracy of the approximate result ARES caused by ignoring these bits in the operands OP1, OP2.

Figure 14:
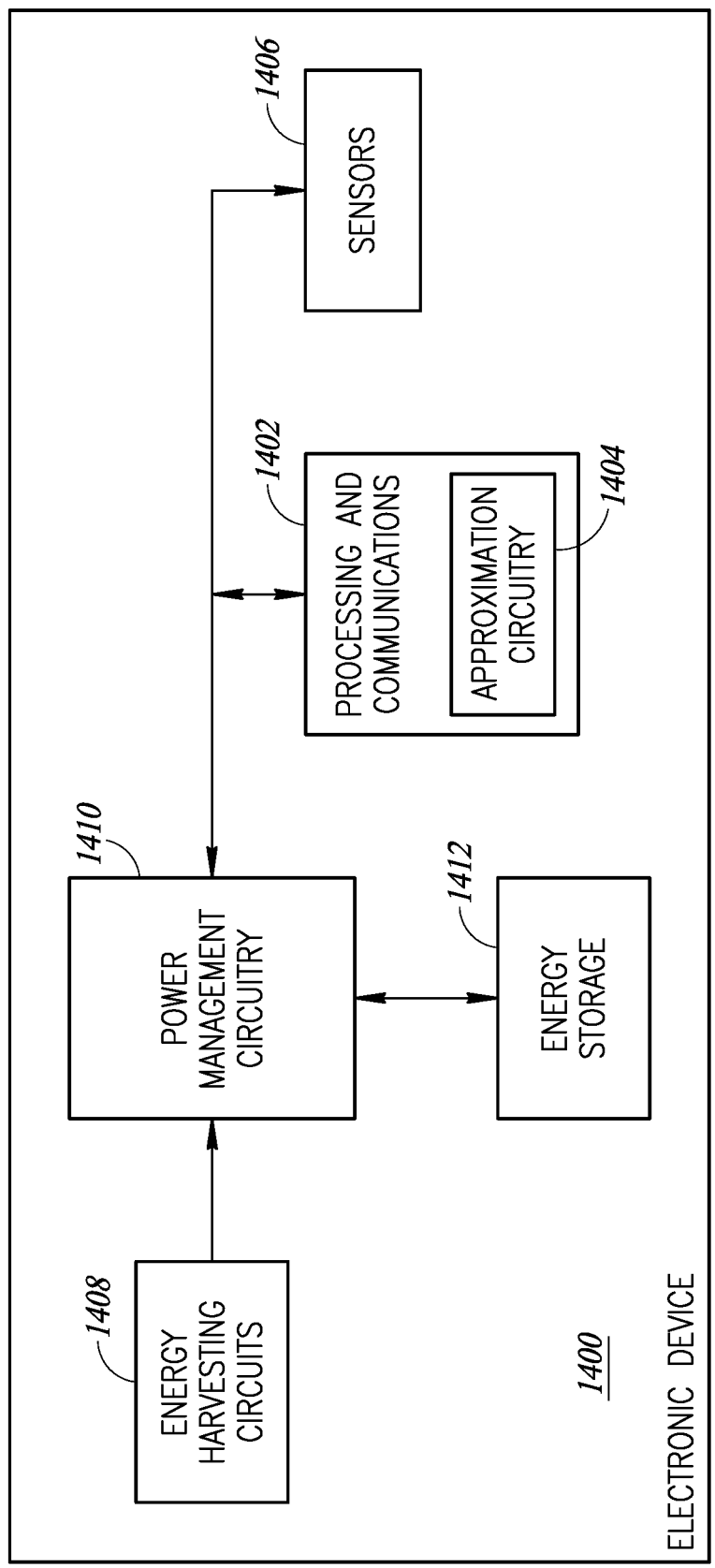
FIG. 14 is a functional block diagram of an electronic device including the approximation circuitry of FIG. 1 according to an embodiment of the present disclosure.

FIG. 14 is a functional block diagram of an electronic device 1400 including processing and communications circuitry 1402 that includes approximation circuitry 1404 according to an embodiment of the present disclosure. The approximation circuitry 1404 corresponds to the embodiments of the approximation circuitry described with reference to FIGS. 1-13A, 13B. The electronic device 1400 includes sensors 1406 that generate digital sensor signals, which are provided the processing and communications circuitry 1402 for further processing. The approximate circuitry 1404 generates approximate results for these digital values or operands from the sensors 1406. As previously discussed, since the approximate circuitry 1404 utilizes bitwise operations in generating the approximate result, the power consumed by the approximation circuitry 1404 is significantly reduced relative to a situation where the processing and communications circuitry 1402 includes a microcontroller for performing operations on the digital values form the sensors 1406.

The electronic device 1400 further includes energy harvesting circuitry 1408 which generates electrical energy for use in powering the electronic device 1400. The energy harvesting circuitry 1408 may, for example, generate electrical energy from physical movement of the electronic device 1400 where the device is a wearable device. Power management circuitry 1410 receives the generated power from the energy harvesting circuitry 1408 and controls the storage of this power in an energy storage device 1412, such as a battery or capacitor, and the supplying of power to the processing and communication circuitry 1402 and the sensors 1406.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:
a first intermediate register configured to store a first approximate value of a first operand, the first operand having N bits and the first approximate value having M bits, where M is less than N;
a second intermediate register configured to store a second approximate value of a second operand, the second operand having N bits and the second approximate value having M bits;
a significant digit detector including first and second operand registers configured to store the first and second operands, the significant bit detector configured perform bitwise comparisons on pairs of bits of the first and second operands to identify an approximate most significant bit in one of the first and second operands, and further configured to store the M bits of the first approximate value in the first intermediate register and to store the M bits of the second approximate value in the second intermediate register; and
a logic circuit coupled to the first and second intermediate registers, the logic circuit configured to generate, based on the approximate values of the first and second operands stored in the first and second intermediate registers, an output signal indicating an approximate value of an operation on the first and second operands.

2. The circuit of claim 1, wherein the logic circuit comprises a lookup table.

3. The circuit of claim 1, wherein the operation is one of multiplication and division.

4. The circuit of claim 1, wherein the first and second intermediate registers are configured to store first and second sign bits of the first and second approximate values, respectively.

5. The circuit of claim 1, wherein each of the first and second operand registers is configured to store the corresponding operand in signed-magnitude format.

6. The circuit of claim 1, wherein the first and second operand registers comprise first and second circular shift registers, respectively, each of the first and second circular shift registers including an output bit storage location configured to store a bit of the corresponding operand and configured to output the stored bit, wherein the bits stored in the output bit storage locations are collectively output as a bitwise pair of bits.

7. The circuit of claim 6, wherein the significant digit detector is further configured to:
store the first and second operands in the first and second circular shift registers, the first and second operands being stored in the first and second circular shift registers with a most significant bit of the first and second operands in the output bit storage location of the first and second circular shift registers, respectively;
control the first and second circular shift registers to sequentially shift the remaining bits of the first and second operands into the output bit storage locations to sequentially output bitwise pairs of bits of the operands;
perform bitwise comparisons on the bitwise pairs of bits sequentially output from the output storage locations to detect whether at least one of the bits of the bitwise pair being output is a non-zero bit; and
identify an approximate most significant bit of the first and second operands in response to detecting at least one of the bits of the bitwise pair being output is a non-zero bit.

8. The circuit of claim 7, wherein each of bits of each operand is in an ith position within the operand, where i is an index from N to 1 and i=N for the most significant bit of each operand in the Nth bit position of the operand and i=1 for the least significant bit in the first bit position of the operand, and wherein the approximate most significant bit of the operands is at an $I_{th}$ bit position of each operand where I is less than or equal to N, and wherein the significant digit detector is further configured to store the Ith bit through the (I−(n−1))th bit of each operand in the intermediate registers, where n is an approximation depth that defines the number of bits of each of the approximate values stored in the intermediate registers.

9. The circuit of claim 7, wherein the significant digit detector further comprises:
a first digital logic gate configured to receive the bit of the first operand in the bitwise pair being output and the bit of the second operand in the bitwise pair being output, the first digital logic gate configured to generate a first gate output that is active in response to the bit of the first operand in the bitwise pair being a non-zero bit and the bit of the second operand in the bitwise pair being a zero bit;
a second digital logic gate configured to receive the bit of the first operand in the bitwise pair being output and the bit of the second operand in the bitwise pair being output, the second digital logic gate configured to generate a second gate output that is active in response to the bit of the first operand in the bitwise pair being a non-zero bit and the bit of the second operand in the bitwise pair being a non-zero bit;
a third digital logic gate configured to receive the bit of the first operand in the bitwise pair being output and the bit of the second operand in the bitwise pair being output, the third digital logic gate configured to generate a third gate output that is active in response to the bit of the first operand in the bitwise pair being a zero bit and the bit of the second operand in the bitwise pair being a non-zero bit;

a first latch coupled to receive the first gate output and configured to drive a first latch output active in response to the first gate output being active;

a second latch coupled to receive the second gate output and configured to drive a second latch output active in response to the second gate output being active;

a third latch coupled to receive the third gate output and configured to drive a third latch output active in response to the third gate output being active; and a multiplexer coupled to the receive the first, second and third latch outputs and to receive the bitwise pair of bits from the first and second circular shift registers, the multiplexer configured to store each bit of the bitwise pair of bits in one of the first and second intermediate registers in response to one of the first, second, and third latch output being active.

10. The circuit of claim 9, where each of the first, second and third digital logic gates is an AND gate.

11. The circuit of claim 9, wherein each of the first and second operands is in signed-magnitude format including a sign bit and a magnitude, and wherein the multiplexer is further configured to receive the sign bits of the first and second operands and to store each sign bit in the one of the first and second intermediate registers storing bits of the magnitude of the corresponding one of the operands.

12. The circuit of claim 10, wherein the significant digit detector further comprises:

a logic gate having a first input coupled to receive an operand register shift end signal and a second input, and having an output signal coupled to provide a multiplexer enable signal to the multiplexer; and logic circuitry coupled to receive the first, second and third latch outputs, the logic circuitry configured to enable the logic gate responsive to one of the first, second and third latch outputs being active.

13. The circuit of claim 9, wherein the multiplexer is configured to receive the first, second, and third latch outputs, the multiplexer enable signal, and the bitwise pair of bits and first and second sign bits of the first and second operands, the multiplexer further comprising:

a first OR gate coupled to receive the first and third latch outputs and configured to generate a first approximate most significant bit signal responsive to the first and third latch outputs;

a node configured to receive the second latch output and to distribute the second latch output as a second approximate most significant bit signal in the multiplexer;

a first logic circuit configured to receive the bitwise pair of bits, the first approximate most significant bit signal, and the second most significant bit signal, the first logic circuit configured to route the bit of the bitwise pair of a larger one of the first and second operands to a first intermediate register output;

a second logic circuit configured to receive the bitwise pair of bits, the first approximate most significant bit signal, and the second most significant bit signal, the second logic circuit configured to route the bit of the bitwise pair of a smaller one of the first and second operands to a second intermediate register output; and a third logic circuit configured to receive the first approximate most significant bit signal, the second most significant bit signal, and the first and second sign bits, the third logic circuit configured to route, in response to the first and second most significant bit signals, one of the first sign bit and second sign bit to a first intermediate register sign bit output and to route the other one of the first and second sign bits to a second intermediate register sign bit output.

14. The circuit of claim 13, wherein the first logic circuit comprises:

a first AND gate having a first input coupled to receive the bit of the first operand in the bitwise pair and a second input coupled to receive the first approximate most significant bit signal, and having a first output;

a second AND gate having a first input coupled to receive the bit of the second operand in the bitwise pair and a second input coupled to receive the second approximate most significant bit signal, and having a second output;

a second OR gate having first and second inputs coupled to the first and second outputs of the first and second AND gates, respectively, and having an output; and a third AND gate having a first input coupled to the output of the second OR gate and a second input coupled to receive the multiplexer enable signal, and having a third output coupled to the first intermediate register output; and wherein the second logic circuit comprises:

a fourth AND gate having a first input coupled to receive the bit of the second operand in the bitwise pair and a second input coupled to receive the first approximate most significant bit signal, and having a fourth output;

a fifth AND gate having a first input coupled to receive the bit of the first operand in the bitwise pair and a second input coupled to receive the second approximate most significant bit signal, and having a fifth output;

a third OR gate having first and second inputs coupled to the fourth and fifth outputs of the fourth and fifth AND gates, respectively, and having an output; and a sixth AND gate having a first input coupled to the output of the third OR gate and a second input coupled to receive the multiplexer enable signal, and having a sixth output coupled to the second intermediate register output.

15. The circuit of claim 14, wherein the third logic circuit comprises:

a seventh AND gate having a first input coupled to receive the first sign bit of the first operand and a second input coupled to receive the first approximate most significant bit signal, and having a seventh output;

an eighth AND gate having a first input coupled to receive the second sign bit of the second operand and a second input coupled to receive the second approximate most significant bit signal, and having an eighth output;

a fourth OR gate having a first input coupled to the seventh output and a second input coupled to the eight output, and having a fourth output coupled to the first sign bit output;

a ninth AND gate having a first input coupled to receive the second sign bit of the second operand and a second input coupled to receive the first approximate most significant bit signal, and having a ninth output;

a tenth AND gate having a first input coupled to receive the first sign bit of the first operand and a second input coupled to receive the second approximate most significant bit signal, and having a tenth output;

a fifth OR gate having a first input coupled to the ninth output and a second input coupled to the tenth output, and having a fifth output coupled to the second sign bit output.

16. An electronic device, comprising:
at least one sensor, each sensor configured to generate a sensor signal;
processing and communications circuitry coupled to the at least one sensor, the processing a communications circuitry configured generate first and second operands from the sensor signal of each at least one sensor and to provide an approximate result of an operation on the first and second operands, the processing and communications circuitry including an approximation circuit including:
  a first intermediate register configured to store a first approximate value of a first operand, the first operand having N bits and the first approximate value having M bits, where M is less than N;
  a second intermediate register configured to store a second approximate value of a second operand, the second operand having N bits and the second approximate value having M bits;
  a significant digit detector including first and second operand registers configured to store the first and second operands, the significant bit detector configured perform bitwise comparisons on pairs of bits of the first and second operands to identify an approximate most significant bit in one of the first and second operands, and further configured to store the M bits of the first approximate value in the first intermediate register and to store the M bits of the second approximate value in the second intermediate register; and
  a logic circuit coupled to the first and second intermediate registers, the logic circuit configured to generate, based on the approximate values of the first and second operands stored in the first and second intermediate registers, an output signal indicating the approximate value of the operation on the first and second operands.

17. The electronic device of claim 16, wherein the electronic device comprises a wearable electronic device.

18. A method, comprising:
storing a first operand in a first intermediate register and a second operand in a second intermediate register, each first and second operand including a most significant bit and a least significant bit;
sequentially performing bitwise comparisons on pairs of bits of the first and second operands starting with the most significant bits of the first and second operands and proceeding towards the least significant bits of the first and second operands;
detecting by a significant digit detector an approximate most significant bit in at least one of the first and second operands in response to a first one of the bitwise comparisons detecting at least one bit of the corresponding pair of bits being a non-zero bit, the approximate most significant bit being at an ith bit of the first and second operands;
storing a first approximate value of the first operand, the first approximate value including the detected approximate most significant bit at the ith bit of first operand, and an (i−1)th bit, (i−2)th bit, through an (i−(n−1))th bit of the first operand, where n is an approximation depth defining a number of bits of the first approximate value;
storing a second approximate value of the second operand, the second approximate value including the detected approximate most significant bit at the ith bit of second operand, and an (i−1)th bit, (i−2)th bit, through an (i−(n−1))th bit of the second operand; and
generating with a logic circuit an approximate value of an operation on the first and second operands, the approximate value derived from a lookup table using the first and second approximate values.

19. The method of claim 18, wherein the first approximate value always includes a non-zero bit in a most significant bit of the first approximate value.

20. The method of claim 18, further comprising adjusting a value of the approximate result of the operation based on the type of the operation and based on a number IB of bits of each of the first and second operands not included in the corresponding first and second approximate values, where the number IB is equal to (i−n).

* * * * *